Nov. 22, 1960    F. A. ROBERTON    2,961,251
WHEEL ADJUSTMENT FOR MOWERS
Filed April 25, 1958    2 Sheets-Sheet 1
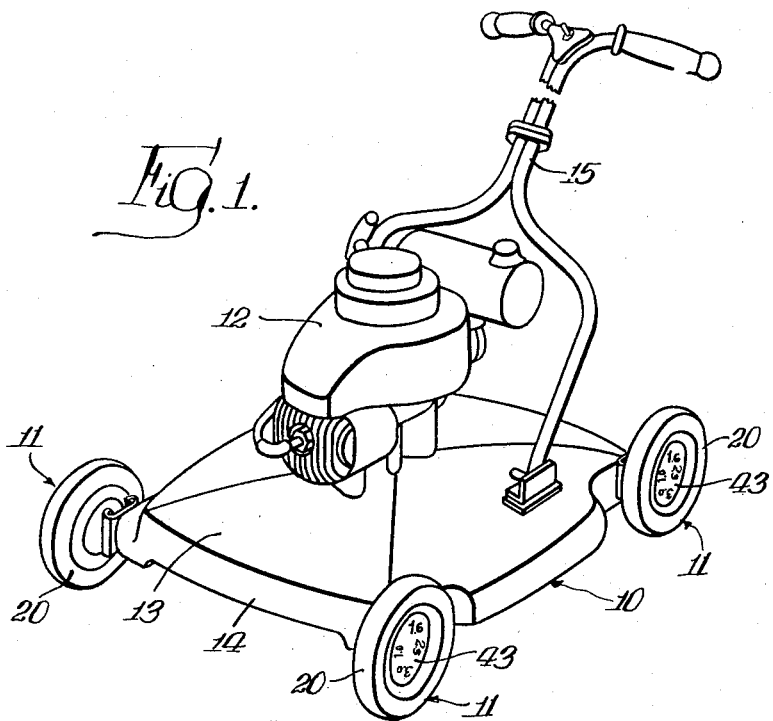
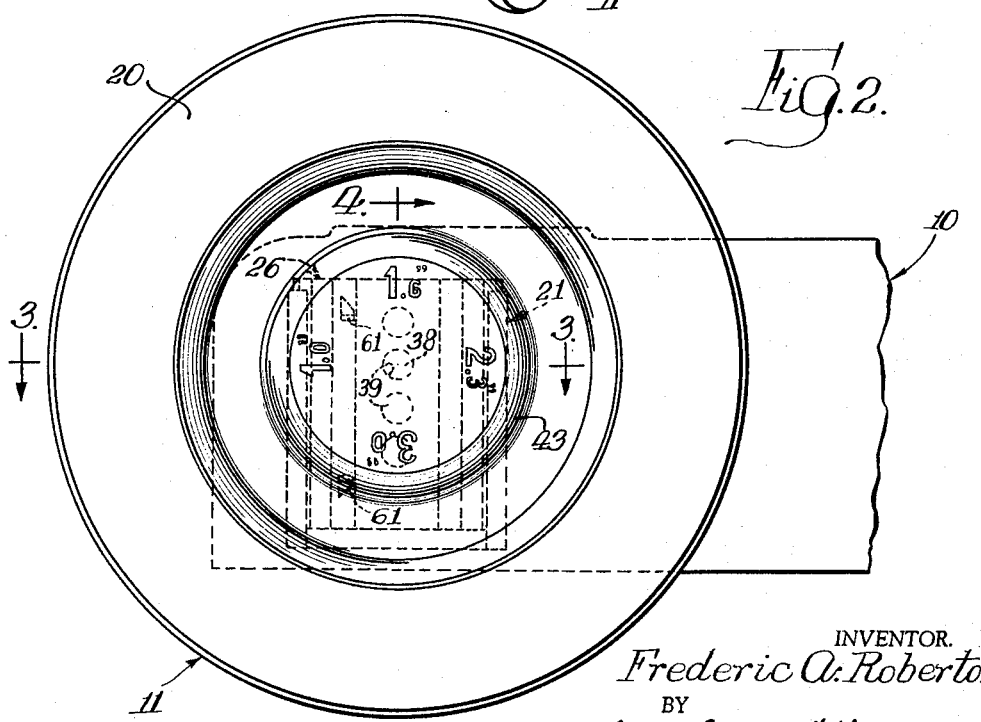
INVENTOR.
Frederic A. Roberton
BY
Davis, Lindsey, Hibben + Noyes
Attys.

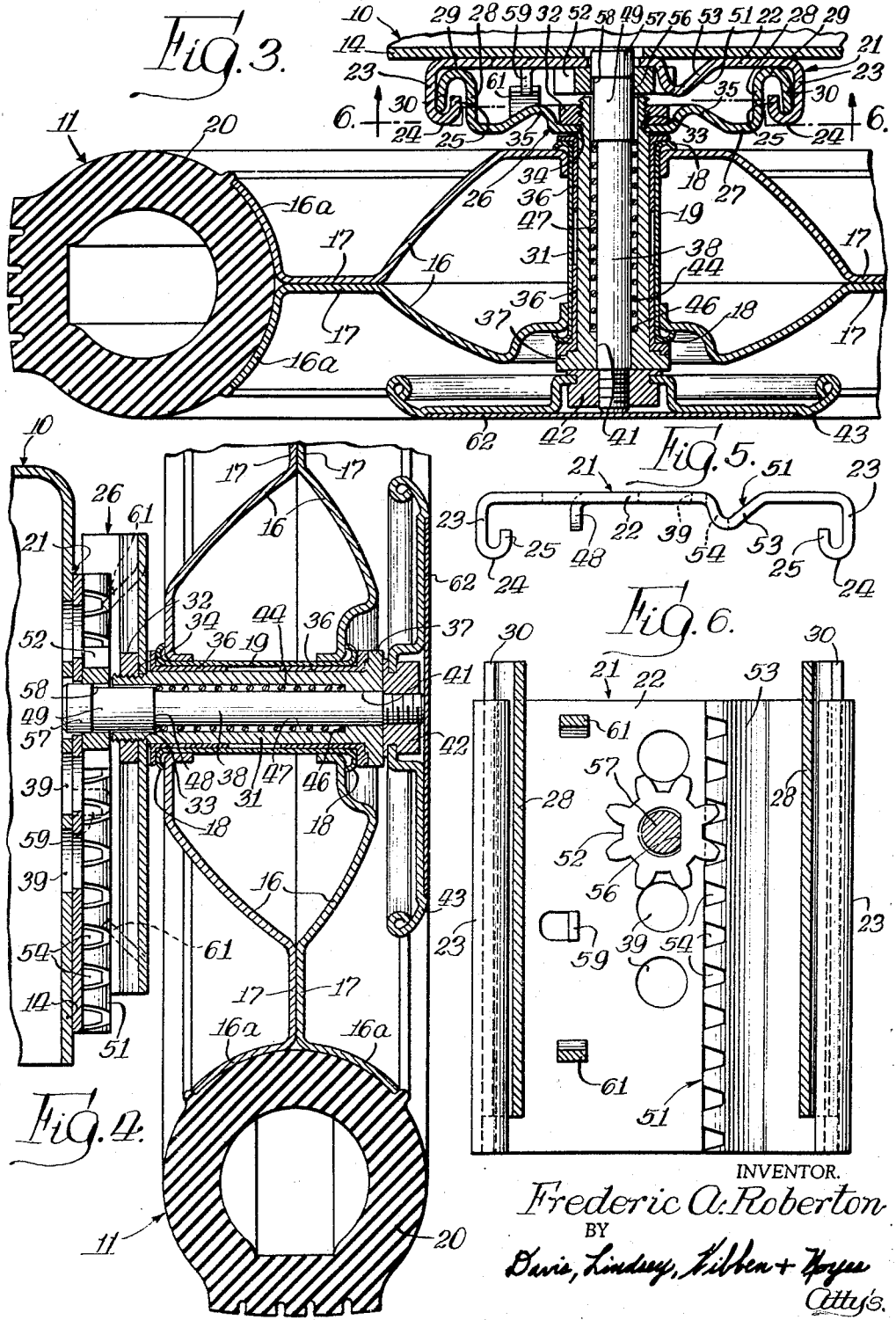

United States Patent Office 2,961,251
Patented Nov. 22, 1960

2,961,251

WHEEL ADJUSTMENT FOR MOWERS

Frederic A. Roberton, Oak Park, Ill., assignor to Roberton Manufacturing Co., Chicago, Ill., a corporation of Illinois Filed Apr. 25, 1958, Ser. No. 731,012

13 Claims. (Cl. 280—43.21)

This invention relates generally to a wheel adjustment for power mowers and more particularly to a wheel adjustment for a mower of the type having a blade mounted for rotation about a vertical axis.

In my copending application Serial No. 618,919, filed October 29, 1956, now Patent No. 2,879,074, I have disclosed and claimed a wheel adjustment for a mower of the type with which the present invention is also adapted for use. Such a mower comprises a casing or frame structure within which a blade is mounted for rotation in a horizontal plane. To drive the blade, a motor such as a gasoline engine is mounted on the casing and its shaft extends downwardly into the casing and has the blade mounted on the lower end thereof. The casing is usually supported on wheels adapted to roll on the ground, and the wheels are usually adjustable on the casing to vary the height of cut effected by the mower.

It is a general object of the present invention to provide a novel support for a wheel of a power mower, which is easily adjusted for different heights of cut and which at all times provides an engaged supported relationship between the wheel and the mower casing.

A specific object of the present invention is to provide a novel adjustable support for a wheel of a mower of the foregoing type, which provides a rigid support for the wheel in any of its adjusted positions and utilizes a gear drive to effect movement of the wheel to its various adjusted positions.

Other objects and advantages will become apparent from the following description taken in connection with the accompanying drawing, in which:

Fig. 1 is a perspective view of a mower provided with a wheel adjustment embodying the features of the invention;

Fig. 2 is an enlarged side elevational view of a portion of the mower, showing one of its wheels;

Fig. 3 is a horizontal sectional view taken on the line 3—3 of Fig. 2;

Fig. 4 is a vertical sectional view taken on the line 4—4 of Fig. 2;

Fig. 5 is a plan view of a portion of the wheel adjustment structure shown in the preceding figures; and Fig. 6 is a side elevational view, with some parts in section, taken on the line 6—6 of Fig. 3.

A mower of the type herein contemplated is generally illustrated in Fig. 1 and is adapted for mowing lawns. Such a mower comprises a casing, indicated generally at 10, supported for movement over the lawn by a plurality of wheels, indicated generally at 11. For effecting the cutting action, the mower has a blade (not shown) adapted to rotate in a horizontal plane under the casing 10. To drive the blade, a motor, such as a gasoline engine 12, is mounted on the top of the casing 10 and has its drive shaft extending downwardly into the casing to support and rotate the blade. In the present instance, the casing 10 is shown as generally rectangular in form and having a top wall 13 merging into a downwardly extending side wall or skirt 14. To move the mower, a handle 15 is pivotally attached to the top wall 13 of the casing 10. In the form of the mower illustrated, four wheels 11 are shown, mounted at the four corners of the casing 10.

Each wheel is shown as comprising a pair of shaped, sheet-metal disc members 16 (Figs. 3 and 4) formed to engage each other along annular web portions 17 and to be so retained by annular inturned flanges 18 at each end of a tubular hub 19 passing through a central perforation in the disc members 16. The hub 19 exerts an axially inward compressive force to maintain the disc members 16 engaged. The peripheries of the disc members 16 are formed with radially concave flanges 16a which together define a rim for receiving a rubber tire 20 therearound.

The vertical position of the wheels 11 on the casing 10 determines the height at which the grass is cut, and to provide for cutting different heights, the wheels are adjustably secured to the casing 10. For this purpose, an adjustable wheel mounting means is provided, comprising generally a vertically extending track member adapted to be secured to the casing 10, a wheel supporting member slidably mounted on the track member for vertical adjustment thereon, manually operable rack and pinion means for moving the wheel supporting member on the track member, an axle for the wheel extending from the wheel supporting member and on which a wheel 11 is mounted, and means for locking the wheel supporting member in its various positions of vertical adjustment.

In the embodiment of the invention illustrated in the drawings, the track member is indicated generally at 21 and in its preferred form is made of sheet metal and comprises a vertically positioned channel having a web portion 22 rigidly secured flatwise to the skirt 14 of the mower casing 10, as by welding, with the flanges 23 thereof projecting outwardly from the casing. The flanges 23 are reversely bent inwardly of the channel, as at 24, to provide inner flange portions 25. Cooperating with the track member 21 is a wheel supporting member, indicated generally at 26, which is movably mounted on the track member 21 and which is also of channel form comprising a web portion 27 positioned in spaced relation to the web portion 22 of the track member. The wheel supporting member 26 also includes a pair of flanges 28 extending inwardly within the inner flange portions 25 of the track member 21, and the flanges 28 are reversely bent outwardly of the channel, as at 29, to provide outer flange portions 30 interposed between the flanges 23 and flange portions 25 of the track member. The members 21 and 26 are thus in interlocked relationship to prevent accidental disengagement of the members. The outer flange portions 30 of the wheel supporting member 26 preferably have a slight outward flare so as to frictionally engage the adjacent enclosing flanges 23 of the track member 21 and thus prevent free sliding movement of the wheel supporting member 26 in the track member 21.

The wheel supporting member 26 is preferably equal in length to the track member 21 so that a substantial portion of its length will be in contact with the track member for all positions of adjustment. The intermeshed engagement of the flange portions 23 and 28 of the two members permits the wheel supporting member to slide in the track member but holds the wheel supporting member against tilting, either in the plane of the track member or sidewardly of said plane. A pair of horizontally spaced, vertically extending ribs 35 are formed in the web portion of the wheel supporting member 26 to increase the rigidity thereof.

The wheel 11 is mounted on the wheel supporting member 26 by an axle 31 extending perpendicularly outwardly from the web portion 27 of the wheel supporting member 26 and secured thereto. The inner end of the axle 31 extends through a perforation 33 in the web 27 and has a smaller diameter than the shaft portion of the axle to define a shoulder 34 for engagement with the outer surface of the web 27. The reduced inner end of the axle is threaded to receive a nut 32 for clamping the web 27 against the shoulder 34. The axle 31 extends through the hub 19 of the wheel 11 and a pair of flanged nylon bushings 36 are disposed between the axle 31 and hub 19 with their flanges abutting the inturned flanges 18 of the hub 19 to provide bearing support for the wheel 11. In order to retain the wheel 11 on the axle 31, the outer end thereof is flanged as at 37 to abut the flange of the outer bushing 36.

Means is provided for locking the wheel 11 in an adjusted position on the track member 21 and relative to the mower casing 10. To this end, the axle 31 is made tubular for slidably receiving a locking pin 38 extending therethrough and selectively engageable with a vertically arranged series of holes 39 in the web 27 of the track member 21 and the skirt 14 of the mower casing 10 to provide a corresponding series of adjusted positions for the wheel 11. The locking pin 38 is located in a bore 41 in the outer end of the tubular axle 31 and has its outer end threaded to receive a nut 42. A disc 43 is connected to the nut 42 to provide means for manually shifting the locking pin 38 between its various locked and unlocked positions. In order to maintain the locking pin 38 engaged in a particular adjustment hole 39, a coil spring 44 is provided and is disposed around the intermediate portion of the locking pin 38 and is seated at its outer end against an internal shoulder 46 defined by a counterbore 47 in the axle 31. At its inner end, the pin 38 has an internal shoulder 48 defined by an enlarged portion 49 on the locking pin 38, substantially equal in diameter to the counterbore 47. The spring 44 is normally under compression, so as to continuously urge the locking pin 38 toward the track member 21 and the adjustment holes 39, the nut 42 limiting the movement of the pin. The adjustment holes in the skirt portion 14 are preferably somewhat larger than the holes in the track member 21, to provide for any inaccuracy in mounting the track member 21 on the casing.

Thus it will be appreciated that the wheel 11 and wheel supporting member 26 may be locked in any one of the adjustment positions by a selective engagement of the locking pin 38 in a particular adjustment hole 39. It will be understood that the number and spacing of the adjustment holes 39 could be varied to provide different adjusted positions for a wheel 11, if desired.

According to the present invention, novel means is provided to effect movement of the wheel supporting member 26 in the track member 21 to the respective adjusted positions. In the present instance, said means comprises a vertically extending rack 51 on the track member 21 and a meshing pinion 52 carried by the wheel supporting member 26 and mounted in coaxial relation with the hub 19 of the wheel 11. The rack 51 is preferably constructed integrally with the track member 21 by bending the web portion 22 to form a vertically extending rib 53. To provide teeth in the rib 53, a series of generally triangular shaped vertically spaced holes 54 are punched in the metal and the rib 53 is formed so that the holes 54 are located in one side of the rib. It should be understood, however, that the rack 51 could be formed separately and thereafter secured to the web 22 of the track member 21, if desired.

The pinion 52 is disposed between the web portions 22 and 27 of the track member 21 and wheel supporting member 26, and is slidably mounted on the enlarged inner end 49 of the locking pin 38 for rotation thereby, a flat 56 being provided on the pinion 52 and enlarged inner end portion 49 of the locking pin 38 to provide a keyed connection therebetween. In order to prevent complete withdrawal of the inner end portion 49 into the counterbore 47 and disengagement from the pinion 52, the enlarged end portion 49 has an enlarged inner head end 57 defining a shoulder 58 therearound. The inner head 57 is of a slightly greater diameter than the counterbore 47 so that the shoulder 58 will engage the end face of the inner end of the axle 31. Inasmuch as the pinion 52 is keyed to the locking pin 38 and meshes with the track member 21, rotation of the pinion by rotation of the disc 43 and locking pin 38 will cause a corresponding upward or downward movement of the wheel supporting member 26 in the track member 21 and a consequent adjustment of the wheel.

As best shown in Fig. 6, four vertically aligned adjustment holes 39 are provided in the web 22 to provide four vertical height adjustment positions for each wheel 11 relative to the mower casing 10 and thus for the cutting blade of the mower relative to the ground. The diameter of the pinion 52 and the spacing of the holes 39 is such as to move the locking pin 38 from one adjustment hole to the next one upon one quarter of a full revolution of the pinion 52.

In order to prevent disengagement of the pinion 52 from the rack 51 by vertical travel beyond the ends thereof, stops are provided. In the present instance, the stops preferably comprise a single centrally disposed struckout prong 59 (Figs. 3, 5 and 6) formed in the web portion 22 of the track member 21 and extending perpendicularly toward the wheel supporting member 26, and a pair of vertically spaced struckout abutment prongs 61 formed in the web portion 27 of the wheel supporting member 26 and extending perpendicularly toward the track member 21. The single prong 59 and the pair of prongs 61 are in vertical alignment and extend perpendicularly away from their respective web portions a sufficient amount to overlap each other so that the prong 59 will engage either of the spaced prongs 61 upon sufficient upward or downward travel of the wheel support member 26 in the track member 21. The wheel support member 26 is initially engaged with the track member 21 by forcing the prong 59 over either of the prongs 61 to depress the same, and permit passage of the prong 59. The depressed prong 61 then springs back into an overlapping position to thereafter engage the prong 59 as a stop.

To adjust a wheel, the operator draws the disc 43 outwardly to withdraw the locking pin from engagement with a particular adjustment hole 39, thus unlocking the wheel support member 26 for sliding movement in the track member 21. The disc 43 is then rotated to cause the keyed pinion 52 to move along the rack 51 and thus shift the wheel supporting member 26 and connected wheel 11 to a different adjusted position.

Inasmuch as the locking pin 38 will always enter a particular adjustment hole 39 in the same rotational position, visual means may be provided on the disc 43 to indicate a particular position thereof and a corresponding adjusted height position of the mower blade relative to the ground. To this end, each disc 43 is provided with a wheel height indicating means 62 having indicia thereon to indicate the various rotational positions of the disc 43 and locking pin 38 relative to the track member 21. As will be seen from Figs. 1 and 2, the indicating means 62 may comprise a decalcomania having four circumferentially spaced numerals thereon, each designating the height in inches that the blade of the mower is spaced above the ground when the locking pin is engaged in a particular adjustment hole. Thus, rotation of the disc 43, which moves the locking pin to a particular hole, brings the corresponding numeral to a right-side-up position. In the present instance, the vertical spacing of the holes 39 in the track member 21 is such as to provide four equal adjustments of approximately 0.6 inch each, the blade height varying from 1.0 inch to 3.0 inches. The decalcomania 62 is preferably placed on the disc member 43 after the wheel support member 26 has been engaged with the track member 21 and the locking pin 38 inserted in any one of the adjustment holes 47. It is thus unnecessary, when assembling the locking pin 38 and pinion 52, to hold them in a particular position of rotation.

From the foregoing it will be apparent that I have provided a novel and improved support for the wheels of a mower of the type mentioned, which can be easily and positively adjusted for different heights of cut with a minimum of effort on the part of a user, due to the provision of a rack and pinion type gear drive between the vertically movable elements of the wheel support structure. In addition, the aforementioned rack and pinion drive is effective to maintain an indexed relationship between the locking pin and a particular adjustment hole, thereby permitting indicia to be utilized to indicate a particular engaged position of the locking pin and consequently the height of the mower blade over the ground.

While only one embodiment of the invention has been herein illustrated and described, it should be understood that variations and modifications may be effected without departing from the scope of the novel concepts herein disclosed, the invention being limited by the scope of the appended claims.

I claim:

1. An adjustable wheel mounting means for a mower of the character described, comprising a vertically extending track member adapted to be rigidly mounted on the casing of the mower, a wheel supporting member movably mounted on said track member for vertical adjustment thereon, a wheel mounted on said wheel supporting member, a pin for locking said wheel supporting member to said track member, a rack and pinion respectively carried by said members for adjusting said wheel supporting member along said track member, said pin being rotatable with said pinion, and means for rotating said pin to rotate said pinion.

2. An adjustable wheel mounting means according to claim 1, in which said track member has a vertically extending rib with teeth formed therein to provide said rack.

3. An adjustable wheel mounting means according to claim 1, in which said track member is formed of sheet metal and is bent to provide a vertically extending rib having teeth formed therein to provide said rack.

4. An adjustable wheel mounting means according to claim 3, in which said teeth are provided by a series of holes in the metal forming one side of said rib.

5. An adjustable wheel mounting means according to claim 1, in which said members are formed of sheet metal and have interlocking flanged portions at their side edges connected by web portions, and one of said members has a pair of vertically spaced prongs extending from its web portion toward the other member, and said other member has a single prong extending from its web portion toward said one member and located between said pair of prongs to limit the relative movement of said members.

6. An adjustable wheel mounting means according to claim 5, in which one of said pair of prongs is yieldable when moved into engagement with said single prong in one direction to permit said one prong to pass over said single prong when said members are assembled together.

7. An adjustable wheel mounting means for a mower of the character described, comprising a vertically extending track member adapted to be rigidly mounted on the casing of the mower, a wheel supporting member movably mounted on said track member for vertical adjustment thereon, a wheel having a tubular axle rigidly secured to said wheel supporting member, a manually rotatable pin extending through said tubular axle for locking said wheel supporting member to said track member, and a rack and pinion respectively carried by said members for adjusting said wheel supporting member along said track member, said pinion being mounted on the end of said pin for rotation therewith.

8. An adjustable wheel mounting means according to claim 7, in which said track member has a vertical series of holes, said pin is slidable in said pinion, and the end of the pin is adapted to selectively enter said holes to hold the wheel in adjusted position.

9. An adjustable wheel mounting means according to claim 7, in which a spring is mounted in said axle for urging said pin into said holes.

10. An adjustable wheel mounting means according to claim 8, in which said pinion is located between said members to hold it against axial movement with said pin and in mesh with said rack.

11. An adjustable wheel mounting means according to claim 8, in which said pin has a shoulder engageable with the end of said axle to prevent withdrawal of the pin from said pinion.

12. An adjustable wheel mounting means for a mower of the character described, comprising a vertically extending track member adapted to be rigidly mounted on the casing of the mower and having a vertical series of holes therein and a vertically extending rack, a wheel supporting member movably mounted on said track member for vertical adjustment thereon, a wheel having a tubular axle rigidly secured to said wheel supporting member, a pinion meshing with said rack, a pin extending through said axle, said pinion being mounted on said pin for rotation therewith but slidable relative thereto, said pin at its inner end being adapted to selectively enter said holes, and a disc on the outer end of said pin for withdrawing said pin from said holes and for rotating said pin to effect rotation of said pinion along said rack.

13. An adjustable wheel mounting means according to claim 12 in which said disc carries indicia for indicating the hole in which said pin is positioned.

References Cited in the file of this patent

UNITED STATES PATENTS

| | | |
|---|---|---|
| 255,991 | Hoopes | Apr. 4, 1882 |
| 2,041,376 | Schmidt | May 19, 1936 |
| 2,418,693 | Breslav | Apr. 8, 1947 |
| 2,709,602 | Orr | May 31, 1955 |
| 2,726,630 | Dickerson | Dec. 13, 1955 |
| 2,740,135 | Church | Apr. 3, 1956 |
| 2,797,928 | Blubaugh | July 2, 1957 |

FOREIGN PATENTS

| | | |
|---|---|---|
| 608,965 | Great Britain | Sept. 23, 1948 |